(12) United States Patent
Sandacz

(10) Patent No.: US 7,906,077 B2
(45) Date of Patent: Mar. 15, 2011

(54) FCC PROCESS WITH SPENT CATALYST RECYCLE

(75) Inventor: Michael S. Sandacz, Glen Ellyn, IL (US)

(73) Assignee: UOP LLC, Des Plaines, IL (US)

( * ) Notice: Subject to any disclaimer, the term of this patent is extended or adjusted under 35 U.S.C. 154(b) by 328 days.

(21) Appl. No.: 11/957,952

(22) Filed: Dec. 17, 2007

(65) Prior Publication Data

US 2009/0152167 A1  Jun. 18, 2009

(51) Int. Cl.
*F27B 15/08* (2006.01)
*F27B 15/09* (2006.01)
*B01J 8/18* (2006.01)
*C10G 11/18* (2006.01)

(52) U.S. Cl. ........ 422/144; 422/145; 422/147; 422/214; 422/215; 208/113

(58) Field of Classification Search ................ 422/144, 422/145, 147, 214, 215, 223; 208/113
See application file for complete search history.

(56) References Cited

U.S. PATENT DOCUMENTS

| | | | |
|---|---|---|---|
| 3,888,762 A | 6/1975 | Gerhold | 208/120 |
| 4,853,105 A | 8/1989 | Herbst et al. | 208/74 |
| 5,372,704 A | 12/1994 | Harandi et al. | 208/74 |
| 5,552,120 A * | 9/1996 | Sechrist et al. | 422/144 |
| 5,597,537 A | 1/1997 | Wegerer et al. | 422/144 |
| 5,858,207 A | 1/1999 | Lomas | 8/113 |
| 6,045,688 A * | 4/2000 | Ruottu et al. | 208/113 |

* cited by examiner

*Primary Examiner* — Walter D Griffin
*Assistant Examiner* — Renee Robinson
(74) *Attorney, Agent, or Firm* — James C Paschall

(57) ABSTRACT

Disclosed is an FCC apparatus and process in which spent catalyst is recycled to the base of the riser to contact fresh feed through a passage disposed within the riser.

18 Claims, 2 Drawing Sheets

FCC PROCESS WITH SPENT CATALYST RECYCLE

BACKGROUND OF THE INVENTION

The field of the invention is the fluid catalytic cracking (FCC) of heavy hydrocarbons into lighter hydrocarbons with a fluidized stream of catalyst particles.

DESCRIPTION OF THE PRIOR ART

Catalytic cracking is accomplished by contacting hydrocarbons in a reaction zone with a catalyst composed of finely divided particulate material. The reaction in catalytic cracking, as opposed to hydrocracking, is carried out in the absence of added hydrogen or the consumption of hydrogen. As the cracking reaction proceeds, substantial amounts of coke are deposited on the catalyst. The catalyst is regenerated at high temperatures by burning coke from the catalyst in a regeneration zone. Coke-containing catalyst, referred to herein as "spent catalyst", is continually transported from the reaction zone to the regeneration zone to be regenerated and replaced by essentially coke-free regenerated catalyst from the regeneration zone. Fluidization of the catalyst particles by various gaseous streams allows the transport of catalyst between the reaction zone and regeneration zone.

Patents disclose processes that use catalyst recycle without regeneration. U.S. Pat. No. 3,888,762 discloses sending stripped catalyst and regenerated catalyst to the base of the riser without mixing. U.S. Pat. No. 4,853,105 discloses an FCC process whereby stripped, spent catalyst is recycled to the riser just less than mid-way up the riser. U.S. Pat. No. 5,858,207 discloses an FCC process wherein regenerated catalyst and stripped spent catalyst are subjected to secondary stripping before being returned to the riser to contact feed. U.S. Pat. No. 5,372,704 discloses an FCC process wherein spent catalyst from a first FCC unit is charged to a riser of a second naphtha cracking unit and then recycled back to the riser of the first FCC unit. U.S. Pat. No. 5,597,537 discloses recycling stripped catalyst to a vessel in which it is mixed with regenerated catalyst and contacted with feed in a riser.

In typical cases, spent catalyst is recycled to the base of the riser by use of a recirculation conduit or standpipe. The standpipe may utilize a slide valve to control catalyst flow rate, an expansion joint to account for thermal expansion and hangers and guides to absorb horizontal and vertical loads, respectively.

It would be advantageous to provide for spent catalyst recycle without use of a standpipe.

SUMMARY OF THE INVENTION

I have discovered that a recycle conduit disposed within the shell of an FCC riser negates the need for an FCC recycle standpipe. The invention also negates the need for the equipment associated with the recycle standpipe.

Additional objects, embodiments, and details of this invention will become apparent from the following detailed description.

DETAILED DESCRIPTION OF THE INVENTION

Figure 1:
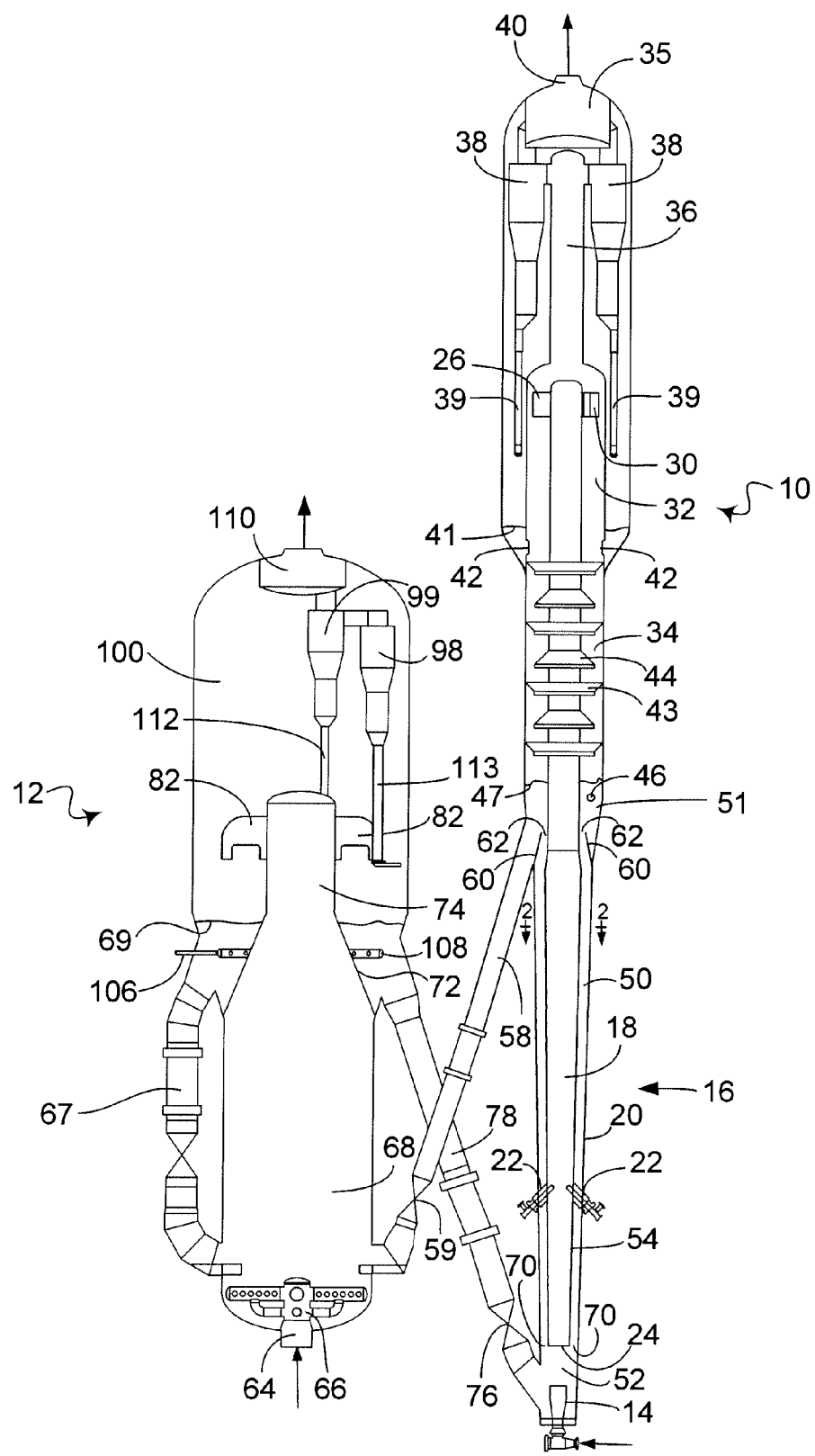
FIG. 1 is a schematic elevational view showing a FCC unit in accordance with the present invention.

This invention is more fully explained in the context of an FCC process that recycles a portion of the spent catalyst without regeneration to the reaction zone. FIG. 1 shows a typical schematic arrangement of a FCC unit arranged in accordance with the present invention. The description of this invention in the context of the specific process arrangement shown is not meant to limit it to the details disclosed therein.

The FCC arrangement shown in FIG. 1 consists of a reactor vessel 10, a regenerator vessel 12, and a reactor riser 16 that provides a pneumatic conveyance zone in which conversion takes place. The arrangement circulates catalyst and contacts feed in the manner hereinafter described.

The catalyst comprises any of the well-known catalysts that are used in the art of fluidized catalytic cracking, such as an active amorphous clay-type catalyst and/or a high activity, crystalline molecular sieve. Molecular sieve catalysts are preferred over amorphous catalysts because of their much-improved selectivity to desired products. Zeolites are the most commonly used molecular sieves in FCC processes. Preferably, the first catalyst comprises a large pore zeolite, such as an Y-type zeolite, an active alumina material, a binder material, comprising either silica or alumina and an inert filler such as kaolin. A catalyst additive may comprise a medium or smaller pore zeolite catalyst exemplified by ZSM-5, ZSM-11, ZSM-12, ZSM-23, ZSM-35, ZSM-38, ZSM-48, and other similar materials. U.S. Pat. No. 3,702,886 describes ZSM-5.

FCC feedstocks, suitable for processing by this invention, include conventional FCC feeds and higher boiling or residual feeds. The most common of the conventional feeds is a vacuum gas oil which is typically a hydrocarbon material having a boiling range of from 343° to 552° C. (650° to 1025° F.) and is prepared by vacuum fractionation of atmospheric residue. Heavy or residual feeds, i.e., boiling above 499° C. (930° F.), are also suitable. The FCC process of the present invention is suited best for feed stocks that are heavier than naptha range hydrocarbons boiling above about 177° C. (350° F.).

Looking then at FIG. 1, the riser reactor 16 provides a conversion zone for cracking of the feed hydrocarbons. The vertical riser 16 may have an inner riser 18 disposed within an outer shell or wall 20. The riser typically operates with dilute phase conditions above the point of feed injection wherein the density is usually less than 320 kg/m$^3$ (20 lb/ft$^3$) and, more typically, less than 160 kg/m$^3$ (10 lb/ft$^3$). Feed is introduced into the inner riser 18 by one or more nozzles or distributors 22 between an entrance 24 to the riser and substantially upstream from an outlet 30. Volumetric expansion resulting from the rapid vaporization of the feed as it enters the riser further decreases the density of the catalyst within the riser to typically less than 160 kg/m$^3$ (10 lb/ft$^3$). Before contacting the catalyst, the feed will ordinarily have a temperature in a range of from 149° to 316° C. (300° to 600° F.). Additional amounts of feed may be added downstream of the initial feed point.

The catalyst and reacted feed vapors are then discharged from the top of riser 16, specifically, the inner riser 18, through the outlet 30 and separated into a cracked product vapor stream including cracked products and a collection of catalyst particles covered with substantial quantities of coke and generally referred to as "spent catalyst." In an effort to minimize the contact time of the products with the catalyst which may promote further conversion of desired products to undesirable other products, any arrangement of separators may be used to remove spent catalyst from the product stream quickly. In particular, a swirl arm arrangement 26, provided at the end of riser 16 can further enhance initial catalyst and cracked hydrocarbon separation by imparting a tangential velocity to the exiting catalyst and cracked product vapor stream mixture. The swirl arm arrangement is located in an upper portion of a disengaging chamber 32, and a stripping zone 34 is situated in the lower portion of the chamber 32. The disengaging chamber is in downstream communication with the outlet 30. Catalyst separated by the swirl arm arrangement 26 drops down into the stripping zone 34. The cracked product vapor stream comprising cracked hydrocarbons and some spent catalyst exit the chamber 32 via conduit 36 in upstream communication with cyclones 38. The cyclones 38 in downstream communication with the outlet 30 via conduit 36 remove remaining catalyst particles from the product vapor stream to reduce particle concentrations to very low levels. The product vapor stream then exits the top of reactor vessel 10 through outlet 40 via plenum chamber 35. Catalyst separated by cyclones 38 return to the reactor vessel 10 through dipleg conduits 39 into dense bed 41 where it will enter the stripping zone 34 in the disengaging chamber 32 through openings 42.

The stripping zone 34 removes hydrocarbons entrained with the spent catalyst and hydrocarbons adsorbed on the surface of the catalyst by counter-current contact with an inert gas such as steam. Baffles 43 and 44 may facilitate contact of the steam with the spent catalyst. Other stripping internals may be suitable. Inert gas enters stripping zone 34 through line 46. A bed 47 of stripped catalyst may accumulate at the base of the stripping zone 34 which can be designated a distribution zone 51 in the disengaging chamber 32.

The present invention recycles a first portion of the spent catalyst to the riser 16 without undergoing regeneration via a passage 50 disposed within a shell or outer wall 20 of the riser reactor 16. A second portion of the spent catalyst is regenerated in the regenerator 12 before it is delivered to the riser 16. The first and second portions of the catalyst may be blended in a blending vessel (not shown) or in a blending zone 52 in the base of the riser reactor before introduction into the inner riser 18 through entrance 24. The length of the inner riser 18 and the passage 50 are disposed within the outer wall 20 of the riser 16. The inner riser 18 and the passage 50 are isolated from each other. The riser reactor 16 may have an inner wall 54 that with the outer wall 20 defines passage 50. In an embodiment, the passage 50 may be an annulus. One or more feed distributors 22 may pass through the passage 50, in which case the feed distributors may have to be appropriately lined with a shield and/or refractory. Alternatively, the passage 50 may be a pipe. The inner riser 18 is in downstream communication with the feed distributor 22. However, because the feed distributor 22 may be in downstream communication with the entrance 24, a portion of the inner riser 18 may be upstream of the feed distributor. In another embodiment, one or more inner walls may each form a single tunnel that provides the passage 50. An inner surface of the inner wall may define the inner riser 18. The first portion of spent catalyst may pass from the stripping zone 34 through an entrance 62, into the passage 50, out an outlet 70 and into the mixing zone 52. The stripping zone 34 is in upstream communication with the distribution zone 51 which is in upstream communication with an entrance 62 to the passage 50. Hence, the entrance 62 to the passage 50 is in downstream communication with the outlet 30. It is contemplated that spent catalyst be transported through passage 50 without undergoing stripping in stripping zone 34. One weir 60 or more extending from the outer wall 20 may define with the inner wall 54 the entrance 62 or more to the passage 50. It is envisaged that weir 60 can pivot or be fixed with a predetermined spacing defining entrance 62 and set at an appropriate elevation to generate an appropriate pressure drop to allow flow or a particular flow rate into the passage 50 when the catalyst bed 47 attains a predetermined level. Levees, hoppers or other suitable devices may be used instead of a weir 60 system.

The second portion of the spent, stripped catalyst is transported to the regeneration zone through spent catalyst conduit 58 in downstream communication with the distribution zone 51 at a rate regulated by control valve 59 for the removal of coke from the catalyst. The control valve 59 may also be used to control the depth of the catalyst bed 47 in the stripping zone 34 which may control the flow rate of spent catalyst into passage 50.

On the regeneration side of the process, spent catalyst transferred to regenerator 12 via conduit 58 undergoes the typical combustion of coke from the surface of the catalyst particles by contact with an oxygen-containing gas. The regenerator vessel 12 may be a combustor-type of regenerator, which may use hybrid turbulent bed-fast fluidized conditions in a high-efficiency regenerator vessel 12 for completely regenerating spent catalyst. However, other regenerator vessels and other flow conditions may be suitable for the present invention. The reactor conduit 58 feeds spent catalyst to a first or lower chamber 68. The spent catalyst from the reactor vessel 10 usually contains carbon in an amount of from 0.2 to 2 wt-%, which is present in the form of coke. An oxygen-containing combustion gas, typically air, enters the first chamber 68 of the regenerator 12 through a conduit 64 and is distributed by a distributor 66. Openings in the distributor 66 emit combustion gas. As the combustion gas contacts spent catalyst, it typically lifts the catalyst under fast fluidized flow conditions. The lifted catalyst may have a catalyst density of from 48 to 320 kg/m$^3$ (3 to 20 lb/ft$^3$) and the combustion gas may have a superficial gas velocity of 1.1 to 2.2 m/s (3.5 to 7 ft/s) in the first chamber 68. The oxygen in the combustion gas contacts the spent catalyst and combusts carbonaceous deposits from the catalyst to at least partially regenerate the catalyst and generate flue gas. Hot regenerated catalyst from a dense catalyst bed 69 in an upper or second chamber 100 may be recirculated into the first chamber 68 via an external recycle standpipe 67 regulated by a control valve to raise the overall temperature of the catalyst and gas mixture in the first chamber 68.

The mixture of catalyst and flue gas in the first chamber 68 ascend through a frustoconical transition section 72 to the transport, riser section 74 of the first chamber 68. The mixture of catalyst and gas accelerates through the reduced cross-sectional area of the riser section 74. Hence, the superficial gas velocity will usually exceed about 2.2 m/s (7 ft/s). The riser section 60 will have a lower catalyst density of less than about 80 kg/m$^3$ (5 lb/ft$^3$).

The regenerator vessel 12 also includes an upper or second chamber 100. The mixture of catalyst particles and flue gas is discharged through disengaging arms 82 from an upper portion of the riser section 74 into the separation chamber 100. Substantially completely regenerated catalyst may exit the top of the transport, riser section 74, but arrangements in which partially regenerated catalyst exits from the first chamber 68 are also contemplated. Discharge is effected through disengaging arms 82 that separate a majority of the regenerated catalyst from the flue gas. The catalyst and gas exit through downwardly directed openings in disengaging arms 82. The sudden loss of momentum and downward flow reversal cause most of the heavier catalyst to fall to the dense catalyst bed 69 and the lighter flue gas and a minor portion of the catalyst still entrained therein to ascend upwardly in the second chamber 100. A fluidizing conduit 106 delivers fluidizing gas, typically air, to the dense catalyst bed 69 through a fluidizing distributor 108.

The combined flue gas and fluidizing gas and entrained particles of catalyst enter one or more cyclone separators 98, 99, which separates catalyst fines from the gas. Flue gas, relatively free of catalyst is withdrawn from the regenerator vessel 12 through an exit conduit 110 while recovered catalyst is returned to the dense catalyst bed 69 through respective diplegs 112, 113.

Regenerated catalyst conduit 78 passes regenerated catalyst from regenerator 12 into the blending zone 52 at a rate regulated by control valve 76 where it is blended with recycled catalyst exiting outlets 70 after descending through passage 50. The outlets 70 and conduit 78 are in upstream communication with the blending zone 52 and entrance 24 to the inner riser 18 is in downstream communication with the blending zone 52 and the regenerated catalyst conduit 78. Fluidizing gas passed into the blending zone 52 by distributor 14 contacts the catalyst and maintains the catalyst in a fluidized state to blend the recycled and regenerated catalyst and lift it into the entrance 24 of the inner riser 18.

The regenerated catalyst which is relatively hot is cooled by the unregenerated, spent catalyst which is relatively cool to reduce the temperature of the regenerated catalyst by 28° to 83° C. (50° to 150° F.) depending upon the regenerator temperature and the spent catalyst recycle rate. The amount of blended catalyst that contacts the feed will vary depending on the temperature of the regenerated catalyst and the ratio of recycled to regenerated catalyst comprising the catalyst blend. The term "blended catalyst" refers to the total amount of solids that contact the feed and include both the regenerated catalyst from regenerator 12 and the recycled catalyst portion from the passage 50. Generally, the blended catalyst to feed will be in a ratio of from 5 to 50. Ordinarily, the ratio of recycled catalyst to regenerated catalyst entering the blending zone will be in a broad range of from 0.1 to 5.0 and more typically in a range of from 0.3 to 3.0. The amount of coke on the recycled catalyst portion returning to the blending zone 52 will vary depending on the number of times the catalyst particle has recycled through the riser. Since the separation of the catalyst particles out of the riser is random, the coke content of the particles leaving the riser will be normally distributed, varying between the coke content of a particle going through the riser only once and the coke content of a particle that has gone through the riser many times. Nevertheless, the spent catalyst portion entering the regeneration zone as well as the recycled catalyst portion could range from an average coke concentration of between 0.3 to 1.1 wt-%. The preferred range of average coke concentration is 0.5 to 1.0 wt-%. Moreover, the blended catalyst composition will contain at least 0.1 wt-% coke before contacting the feed.

Regenerated catalyst from regenerator standpipe 78 will usually have a temperature in a range from 677° to 760° C. (1250° to 1400° F.) and, more typically, in a range of from 699° to 760° C. (1290° to 1400° F.). The temperature of the recycled catalyst portion will usually be in a range of from 510° to 621° C. (950° to 1150° F.). The relative proportions of the recycled and regenerated catalyst will determine the temperature of the blended catalyst mixture that enters the riser. The blended catalyst mixture will usually range from about 593° to 704° C. (1100° to 1300° F.) and, more preferably at about 649° C. (1200° F.).

Inner surface of outer wall 20 and inner wall 54 and outer surface of inner 54 should be lined with refractory as well as weirs 60 and portions of distributors 22 that may be impacted by catalyst flow.

Figure 2:
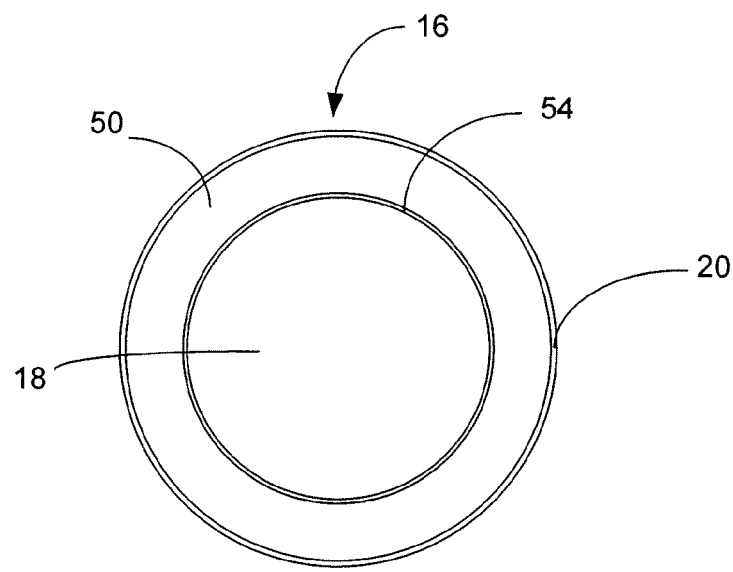
FIG. 2 is a sectional view taken from segment 2-2.

FIG. 2 is a sectional view of the riser 16 and recycle catalyst passage 50 of FIG. 1. The recycle passage 50 is concentric with the inner riser 18. An inner surface of the outer wall 20 of the riser and the outer surface of the inner wall 54 define passage 50 which provides for downward recycle of spent catalyst. The inner riser 18 is defined by inner surface of inner wall 54. Downwardly located equipment such as feed distributors 22 are not shown. Appropriate equipment will be necessary to support the inner riser 18 within the riser 16.

Figure 3:
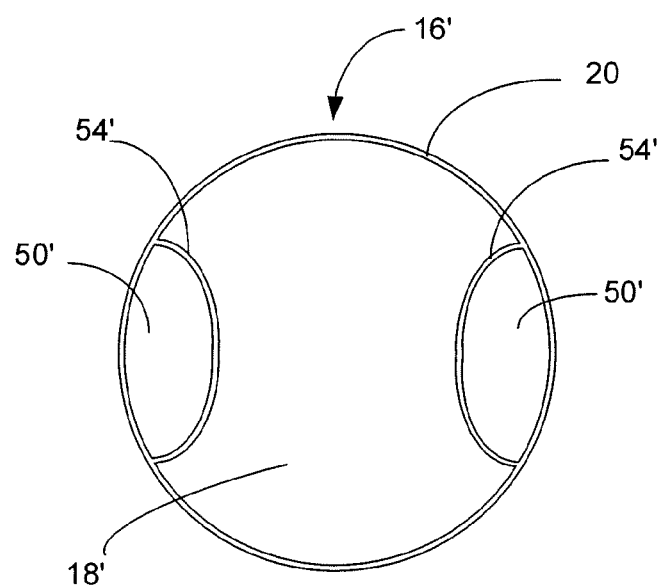
FIG. 3 is an alternative sectional view of FIG. 2.

FIG. 3 is an alternative sectional view of FIG. 2 in which reference numerals corresponding to elements with different configurations designated with a prime symbol ("'"). The riser 16' contains two recycle catalyst passages 50'. More or less are contemplated with alternative shapes and configurations. The recycle passages 50' are spaced apart on opposed sides of the riser 16'. A portion of an inner surface of the outer wall 20 of the riser 16' and the outer surface of two inner walls 54' respectively define passages 50' which provide for downward recycle of spent catalyst. The inner riser 18' is defined by portions of inner surfaces of the outer wall 20 of the riser 16' and by inner surfaces of inner walls 54'. Other alternatives may also be suitable.

The invention claimed is:

1. An FCC reactor comprising:
   a riser having an outer wall;
   an inner riser within said outer wall in downstream communication with a feed distributor for injecting feed into said inner riser, said inner riser having an entrance in downstream communication with a regenerated catalyst conduit and an inner riser outlet for discharging catalyst and cracked feed;
   a disengaging chamber;
   a passage within said outer wall in downstream communication with said riser outlet, said passage having a passage outlet in upstream communication with said entrance and an inlet to said passage is disposed in said disengaging chamber.

2. The FCC reactor of claim 1 including an inner wall disposed within the outer wall, the outer wall and the inner wall defining said passage for downward passage of catalyst and said inner wall also defining said inner riser for the upward passage of catalyst.

3. The FCC reactor of claim 2 in which the disengaging chamber includes a stripping zone.

4. The FCC reactor of claim 2 in which a spent catalyst conduit is in downstream communication with a disengaging chamber.

5. The FCC reactor of claim 1 in which said entrance to the inner riser is disposed in a blending zone of the riser.

6. The FCC reactor of claim 1 in which said passage outlet is in upstream communication with a blending zone.

7. The FCC reactor of claim 1 in which a regenerated catalyst conduit is in upstream communication with a blending zone.

8. The FCC reactor of claim 1 in which a weir defines an entrance to the passage.

9. The FCC reactor of claim 1 in which the passage and the inner riser are concentric.

10. The FCC reactor of claim 1 in which the passage is non-concentric with the inner riser.

11. An FCC reactor comprising:
    an elongated riser including an inner riser in which a hydrocarbon feed is contacted with catalyst particles to produce a gaseous product and coked catalyst particles;
    a disengaging chamber in downstream communication with an outlet of said inner riser;

a cyclone in downstream communication with said outlet for further separating said catalyst particles from said gaseous product; and a passage within said elongated riser for conveying coked catalyst particles to a base of the elongated riser.

12. The FCC reactor of claim 11 further comprising a stripping zone in the disengaging chamber.

13. The FCC reactor of claim 11 in which an entrance to the passage is disposed in the disengaging chamber.

14. The FCC reactor of claim 11 in which an inlet to the inner riser is disposed in a blending zone in the elongated riser.

15. The FCC reactor of claim 11 in which an outlet from the passage is in upstream communication with a blending zone.

16. The FCC reactor of claim 11 in which a weir defines an entrance to the passage.

17. The FCC reactor of claim 11 in which a spent catalyst conduit is in downstream communication with said disengaging chamber.

18. The FCC reactor of claim 11 in which the passage and the inner riser are concentric.

* * * * *